Figure 1:
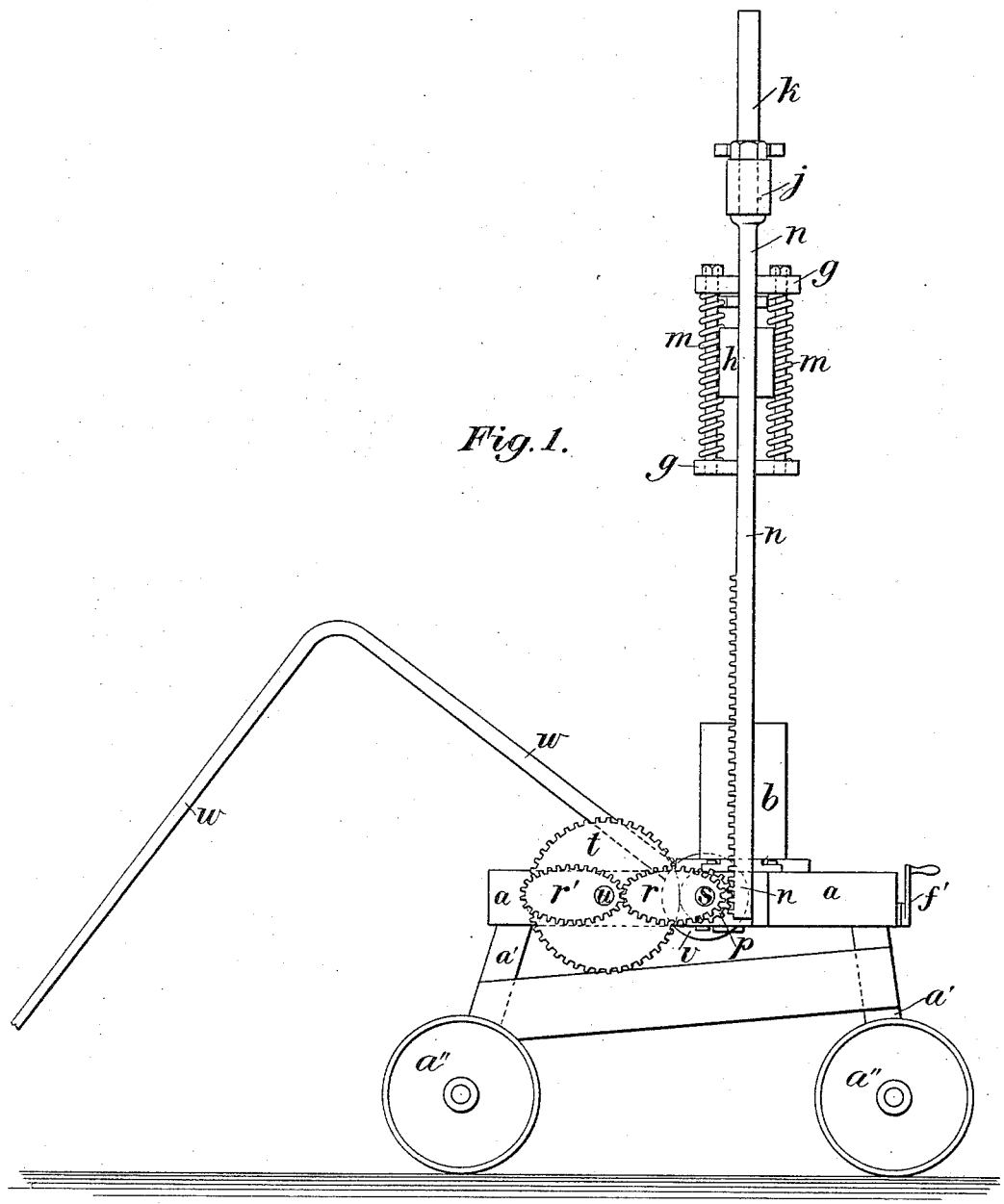

(No Model.) 3 Sheets—Sheet 2.

C. H. READ.
GLASS PRESS.

No. 442,330. Patented Dec. 9, 1890.

WITNESSES. INVENTOR.

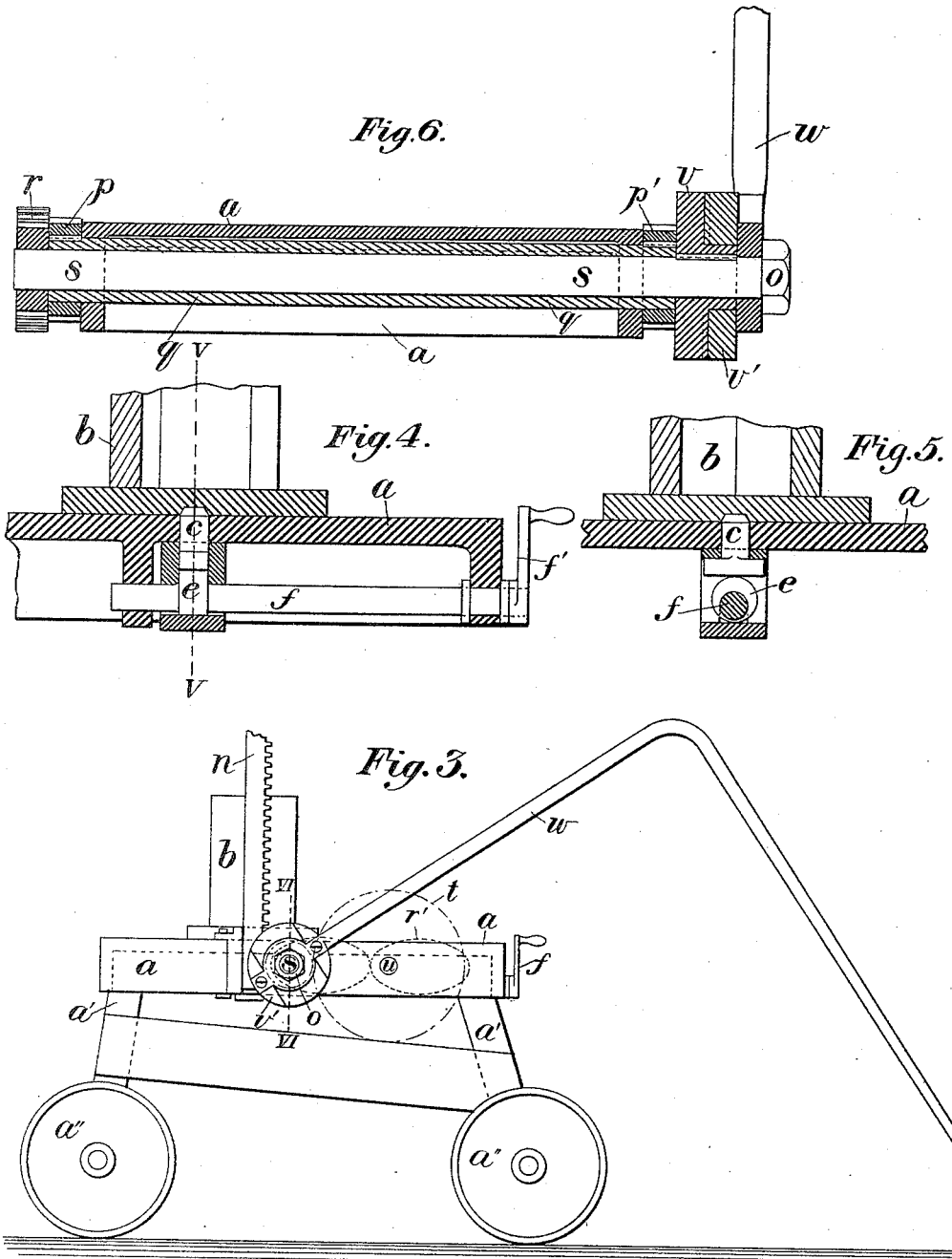

UNITED STATES PATENT OFFICE.

CHARLES H. READ, OF PITTSBURG, PENNSYLVANIA.

GLASS-PRESS.

SPECIFICATION forming part of Letters Patent No. 442,330, dated December 9, 1890.

Application filed August 15, 1889. Renewed November 12, 1890. Serial No. 371,163. (No model.)

*To all whom it may concern:*

Be it known that I, CHARLES H. READ, of Pittsburg, in the county of Allegheny and State of Pennsylvania, have invented a new and useful Improvement in Glass-Presses, of which the following is a full, clear, and exact description.

In the operation of pressing glass in a mold as ordinarily practiced the mold in which the glass is to be formed is placed upon the bed of the press underneath, but in front of the plunger. The operator's assistant then gathers a quantity of molten glass from the pot, and holding it over the mold allows it to drop, and when the operator thinks the amount of glass in the cavity of the mold is sufficient to make the desired article he cuts it off with his shears. The mold is then centered under the plunger by pushing it back on the bed-plate against a couple of adjustable stops. The operator then reaches up to the lever, and drawing it down causes the plunger to descend and enter the mold, continuing the pressure until he becomes aware by the feeling of the lever that the glass has been pressed up to fill the mold, when he stops the pressure and releases the lever, lest by excessive pressure the glass should be injured. This is a delicate operation, requiring considerable skill and experience, and a perfect control of the lever at the time when the application of pressure should cease. It is very important, also, that the plunger should be inserted in the mold as soon as possible before the glass has time to become chilled, and hence it is the ordinary practice to raise the plunger but a short distance above the top of the mold, and in order to facilitate the dropping of the glass into the mold the mold is drawn forward, and then when it has received the glass is pushed back against the stops; but as the mold gets hotter from continued use it expands until the stops applied to its circumference cease to afford an accurate guide for centering it under the plunger. Another difficulty in the use of glass-presses as ordinarily constructed is that in order to prevent the chilling of the glass, and to cause the plunger to enter the mold as soon as possible after the glass is dropped, the plunger is moved more rapidly during the first part of its downstroke than at the end of its stroke, thus increasing the pressure as the speed is reduced, and to accomplish this the plunger is caused to descend in a path which is curved, and not by a vertical movement, the effect of which is that it is very difficult to insure its entry into the mold in a line exactly coincident with the axis of the mold, which frequently causes irregularities of thickness in the finished article.

The object of my invention is to obviate these practical difficulties, which I accomplish chiefly by providing means for centering the mold on the press from its axial center, and not from its circumference; by causing the plunger to perform its stroke in a vertical line coincident with the axis of the mold, while at the same time securing more effectually the increasing speed on its downstroke; by employing a bent lever to secure a more perfect control of the pressure applied to the glass, and by providing means for readily adjusting the position of the lever to secure this object.

Figure 2:
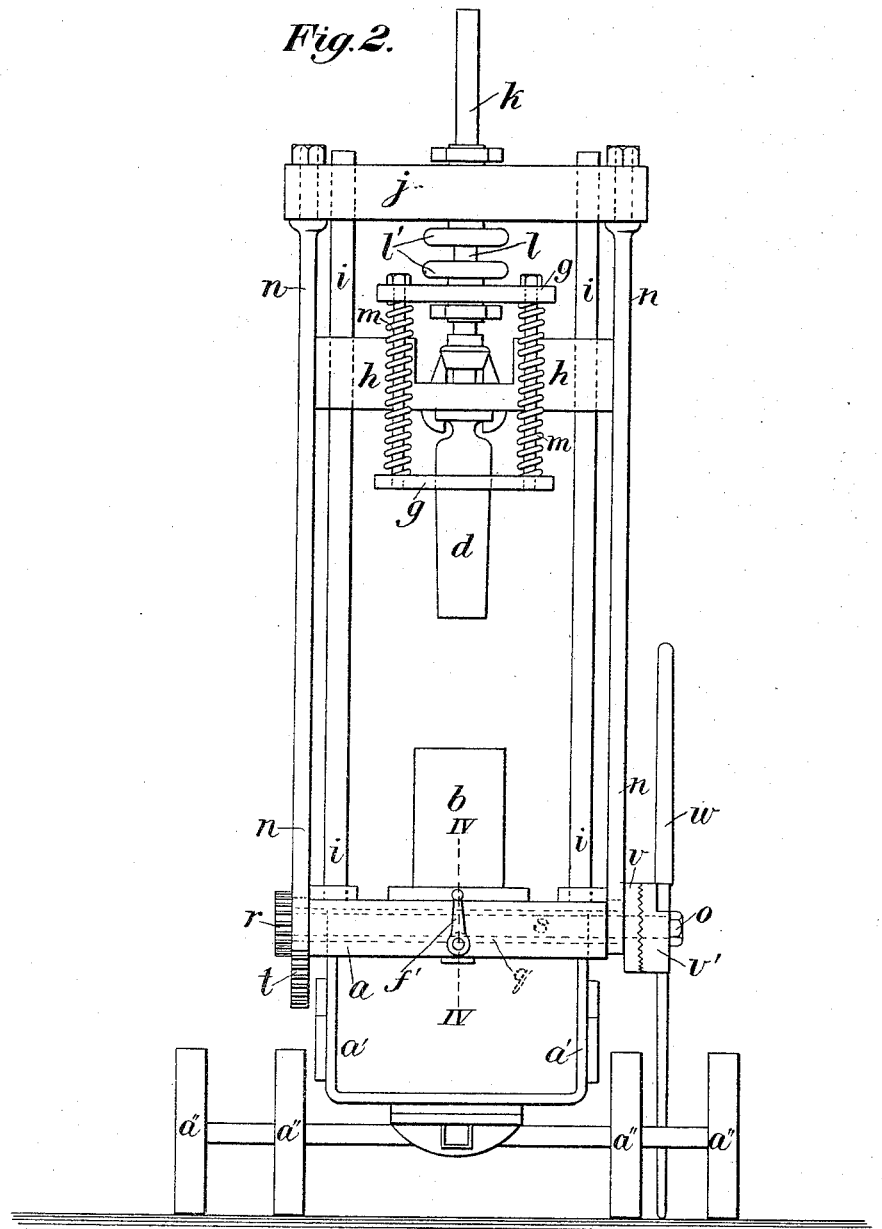

In the accompanying drawings, in each of which like symbols are used to refer to the same parts, Figure 1 is a side elevation of my machine, showing the plunger raised. Fig. 2 is an end elevation, also showing the plunger raised. Fig. 3 is a side elevation of the lower portion of the press, showing the other side from that exhibited in Fig. 1 with the lever in the same position. Figs. 4, 5, and 6 are details of construction.

The press-carriage consists of a bed $a$, supported on legs $a'$ and wheels $a''$. The mold $b$ is of any desired construction, but has a circular recess in the under side of its bottom in the center or line of its axis, into which fits a pin $c$, placed vertically in the bed-plate $a$ of the press in the exact vertical line, which, if extended, will pass through the axis of the plunger $d$. This pin $c$ is raised or lowered by a cam $e$, attached to a short horizontal shaft $f$, which extends out to the front of the machine and is operated by a hand wheel or crank $f'$. By means of this pin and crank and the notch in the bottom of the mold it is easily and rapidly centered on the bed-plate in the exact required position under the plunger, and the centering of the mold is not affected by its expansion or contraction.

The plunger-frame $g$ is attached to a block $h$, which slides on a pair of stationary vertical posts $i$ $i$, which are attached to the bed-plate $a$ and constitute the upper frame of the machine. A cross-head $j$ also slides on the posts $i$ $i$ and supports the rod $k$, to which the plunger $d$ is immediately attached and by which the height of the plunger is accurately adjusted by means of the screw $l$ and its hand-wheel $l'$. There is, however, nothing new in the construction of the plunger-frame, plunger, cross-head, or adjusting-screw or the springs $m$ by which the plunger is automatically raised out of the mold.

Attached to the cross-head $j$ are two vertical connecting-rods $n$ $n$, one at each end of the cross-head and on each side of the press, by which the descent of the plunger is effected and controlled. These connecting-rods being attached to the cross-head $j$ have an accurately vertical motion parallel to the posts $i$ $i$ up and down, it being an important part of my improvement that the stroke of the plunger of the press should be not only vertical, but always in exactly the same line coincident with that of the axis of the mold, so that the plunger may not be deflected in any direction, but may, when within the mold, be surrounded by a cavity of accurately-uniform thickness at all points in the same horizontal plane. The connecting-rods $n$ $n$ have gear-teeth on one side, which mesh into a cog-wheel $p$, there being one such cog-wheel at each side of the press, keyed to the same sleeve-shaft $q$, so that the connecting-rods may move simultaneously and in unison. Having a vertically-moving plunger, it is necessary to provide special means for securing the variable speed of its stroke, before referred to, so that when the plunger commences its descent and has no work to do it may move as rapidly as possible, and that when it enters the mold the motion may be slow and with increased power.

The arrangement of the gear-wheels and shafts, by which a vertical motion of varying speed may be obtained, will be more clearly understood by reference to Fig. 6, which shows the shafts and gear-wheels (with the exception of the main or lever shaft $s$) in section.

The main shaft $s$ extends across and has its bearings in the lower frame of the machine, and on this shaft the lever $w$ is loosely journaled, as hereinafter described. To the main shaft $s$, at one side of the machine, is keyed an elliptical gear-wheel $r$, which meshes with a corresponding elliptical gear-wheel $r'$, supported on the frame of the machine by a shaft $u$. To the elliptical gear-wheel $r'$ is rigidly attached a circular cog-wheel $t$, which meshes with a smaller-diameter cog-wheel $p$, keyed to a hollow or sleeve shaft $q$, through which the main shaft $s$ passes, forming its bearing. A similar cog-wheel $p'$ is keyed to the opposite end of the sleeve-shaft $q$. This gearing is so arranged, as shown in Figs. 1, 2, and 3, that the cog-teeth on the vertical connecting-rods $n$ $n$ gear into the teeth of the cog-wheels $p$ $p'$ and draw down the plunger in an accurately-vertical path. To the main shaft $s$ is rigidly attached one half $v$ of a crab or clutch, and the other half $v'$ of the crab is rigidly attached to the lever $w$, the half-crab $v'$ and lever $w$ being loosely journaled on the shaft $s$. By the lever $w$ the plunger-frame is lowered or raised through the instrumentality of the gear-wheels and connecting-rods, as just described. The object of the crab $v$ $v'$ is to adjust the lever $w$ so that when at the lowest point of its stroke it may have caused the plunger to descend sufficiently into the mold or to adjust it to the height of the operator. This adjustment is effected by means of the screw-nut $o$ on the outer end of the shaft $s$. When the nut $o$ is loosened, the two parts $v$ $v'$ of the crab are no longer bound together, so that the lever can be turned without moving the connecting-rods, and with it the outer half $v'$ of the crab, to the required position, when the nut is again tightened, thus securing the lever in the desired position. By this construction and arrangement when the lever $w$ is in the position shown in Fig. 1—that is, turned over to the rear of the press—and the mold is placed under the plunger and accurately centered by the pin $c$, as before described, the plunger is at the top of its upstroke. It is then adjusted by means of the screws so that its lowest point is a sufficient height (say twelve inches, more or less) above the top of the mold, which gives ample room for the introduction of the glass without moving the mold (as has ordinarily to be done) from its centered position and permits of the helper standing at the rear end of the press, while the pressman stands at the front end, which is another advantage of my improvement. As soon as the glass has been dropped into the mold by the helper and cut off by the pressman the helper throws up the lever $w$ toward the front of the machine, where the pressman stands ready to take hold of it. Owing to the construction already described the plunger begins its descent very rapidly, decreasing in speed, however, so that when it enters the mold its motion is slow and the pressure exerted is correspondingly increased. The pressman then depresses the lever, and owing to the bent shape of the lever and its adjustment to suit the height of the operator he is able to exercise full and accurate control of the pressure applied to the glass. This is a very important matter. In the use of presses as now ordinarily constructed the pressman when pulling the lever down at the end of the stroke throws himself back so far as almost, if not quite, to sit on the ground. In this position he cannot have that perfect control of the lever which would enable him to regulate the pressure at the end of the stroke and stop it when he perceives by the sense of touch that the glass has risen up to the neck of the mold and when any further pressure would be an injury to the glass. By my construction of lever, however, when properly adjusted, as I have described, the pressman can bring the lever down to the end of the stroke while he is in a position of body to maintain full control of its operation. When the stroke is completed, the pressman throws the lever up and over to the rear of the machine, when the parts are ready for a repetition of the operation.

By the use of my improved press the operation of pressing articles of glassware can be performed to much greater advantage than with presses of the ordinary construction. An absolute saving of time between the dropping of the glass and the application of the pressure is effected and danger of imperfect centering of the mold is averted, besides the advantages already mentioned arising from the vertical motion of the plunger and the shape and adjustment of the lever.

What I claim as my invention, and desire to secure by Letters Patent, is—

1. In glass-presses, the combination, with the plunger-frame and its supports, of vertical connecting-rods and elliptical gearing connecting with circular gearing so as to effect an increased length of stroke of the plunger in a vertical line, with a rapid descent at the first part of the stroke and a relatively slow motion at the time when the plunger enters the mold and acts on the molten glass contained therein, substantially as and for the purposes described.

2. In combination with the bed and plunger and plunger-frame of a glass-press, the bent lever and a crab on the lever-shaft for adjusting the position and stroke of the lever, substantially as described.

3. In glass presses and molds, a center pin capable of motion in a vertical direction in the bed of the press, in combination with a mold having a correspondingly-shaped recess at the center of its under side for receiving the projecting end of the center pin, and a cam connected with the pin and adapted to raise and lower the same, substantially as and for the purposes described.

In testimony whereof I have hereunto set my hand this 9th day of August, A. D. 1889.

CHARLES H. READ.

Witnesses
W. B. CORWIN,
H. L. GILL.